US010073771B2

(12) United States Patent
Tsao et al.

(10) Patent No.: US 10,073,771 B2
(45) Date of Patent: Sep. 11, 2018

(54) DATA STORAGE METHOD AND SYSTEM THEREOF

(71) Applicant: AccelStor, Inc., New Taipei (TW)

(72) Inventors: Shih-Chiang Tsao, New Taipei (TW); Ting-Fang Chien, New Taipei (TW); An-Nan Chang, New Taipei (TW)

(73) Assignee: ACCELSTOR LTD., Taipei (TW)

( * ) Notice: Subject to any disclaimer, the term of this patent is extended or adjusted under 35 U.S.C. 154(b) by 25 days.

(21) Appl. No.: 15/052,958

(22) Filed: Feb. 25, 2016

(65) Prior Publication Data

US 2017/0220462 A1   Aug. 3, 2017

(30) Foreign Application Priority Data

Jan. 29, 2016   (TW) .............................. 105102973 A

(51) Int. Cl.
*G06F 12/00* (2006.01)
*G06F 12/02* (2006.01)
*G06F 3/06* (2006.01)
*G06F 12/06* (2006.01)

(52) U.S. Cl.
CPC .......... *G06F 12/0253* (2013.01); *G06F 3/064* (2013.01); *G06F 3/0608* (2013.01); *G06F 3/0652* (2013.01); *G06F 3/0685* (2013.01); *G06F 12/0646* (2013.01); *G06F 2212/1044* (2013.01); *G06F 2212/214* (2013.01); *G06F 2212/7201* (2013.01); *G06F 2212/7205* (2013.01)

(58) Field of Classification Search
CPC ......... G06F 12/0246; G06F 2212/7201; G06F 12/1009; G06F 2212/7205; G06F 3/0608; G06F 12/10
See application file for complete search history.

(56) References Cited

U.S. PATENT DOCUMENTS

| | | | |
|---|---|---|---|
| 8,966,205 B1* | 2/2015 | Lo ...................... | G06F 12/0246 711/165 |
| 9,489,296 B1* | 11/2016 | Tomlin ................ | G06F 12/0253 |
| 2010/0180145 A1* | 7/2010 | Chu ..................... | G06F 12/0246 714/2 |
| 2011/0161621 A1* | 6/2011 | Sinclair ............... | G06F 12/0246 711/207 |
| 2014/0052898 A1* | 2/2014 | Nan .................... | G06F 12/0246 711/103 |

* cited by examiner

*Primary Examiner* — Arvind Talukdar
(74) *Attorney, Agent, or Firm* — McClure, Qualey & Rodack, LLP

(57) ABSTRACT

A data storage method and a system thereof are disclosed. The data storage method includes allocating a first logical block and a second logical block, which are mapped to a physical block; the first logical block includes consecutive first logical pages, used to store logical addresses, and the second logical block includes consecutive second logical pages; on executing garbage collection, sequentially and consecutively storing valid logical addresses in second logical pages in the order of the second logical pages according to valid bits; and establishing a one-to-one second mapping relationship between the second logical pages and valid data pages according to the first mapping relationship.

12 Claims, 3 Drawing Sheets

DATA STORAGE METHOD AND SYSTEM THEREOF

CROSS-REFERENCES TO RELATED APPLICATIONS

This non-provisional application claims priority under 35 U.S.C. § 119(a) on Patent Application No. 105102973 filed in Taiwan, R.O.C. on 2016 Jan. 29, the entire contents of which are hereby incorporated by reference.

BACKGROUND

Technical Field

The instant disclosure relates to a data storage method, in particular to a data storage method, which can be applied to a data storage system such as a hard disk.

Related Art

In recent years, the development of non-volatile storage devices, such as a solid-state drive, has been flourishing. Since storage capacity, power consumption and integration of flash memory are better than a conventional hard dish drive, flash memory has become an ideal component as a storage device in electronic devices.

A conventional flash memory includes many storage blocks for storing data, and each storage block is composed of many storage pages. After the stored data in a flash memory have been updated several times, the old data, originally stored in the storage pages, may become invalid. In this situation, it is necessary to execute garbage collection to erase invalid data, in order to release the storage pages which are occupied by the invalid data. However, the storage pages can only be re-written once the storage block is entirely and successfully erased, and the time to erase a storage block is much longer than the time to write a storage page. For example, while it may take about 200 microseconds to write a storage page, it will take about 2 milliseconds to erase a storage block. The procedure of erasing a flash memory can greatly reduce read-write performance accordingly Furthermore, before a storage block is to be erased, the valid data in the storage block must be moved to other storage pages in a flash memory so that the storage block can then be erased. Since each storage page in a flash memory can be read/written for a limited times, moving the data will result in extra read/write, i.e., increasing the times of read/write of a storage page, thereby reducing the lifetime of a flash memory.

SUMMARY

In view of these, this instant disclosure provides a data storage method and a system thereof.

In one embodiment of the instant disclosure, a data storage system includes a hard disk and a processing unit. A hard disk includes a physical block, which includes a plurality of physical pages, which store a plurality of written data corresponding to a plurality of logical addresses. Each of the physical pages corresponds to a valid bit. And each of the physical pages with the valid bit corresponding to a first value is classified as a valid data page, or each of the physical pages with the valid bit corresponding to a second value is classified as an invalid data page. A processing unit allocates a first logical block and a second logical block, wherein the first logical block and the second logical block are mapped to the physical block. The first logical block includes a plurality of consecutive first logical pages and the second logical block includes a plurality of consecutive second logical pages. The first logical pages are used to store the logical addresses, which include a plurality of valid logical addresses, which are mapped to the valid data pages, and there is a one-to-one first mapping relationship between the valid logical addresses and the valid data pages. On executing garbage collection, the processing unit sequentially and consecutively stores the valid logical addresses in the second logical pages in the order of the second logical pages according to the valid bits. And the processing unit establishes a one-to-one second mapping relationship between the second logical pages and the valid data pages according to the first mapping relationship.

In an embodiment, a data storage method is used to store a plurality of written data in a plurality of physical pages in a physical block in a hard disk according to a plurality of logical addresses. Each of the physical pages corresponds to a valid bit. And each of the physical pages with the valid bit corresponding to a first value is classified as a valid data page, or each of the physical pages with the valid bit corresponding to a second value is classified as an invalid data page. The logical addresses include a plurality of valid logical addresses, which are mapped to the valid data pages, and there is a one-to-one first mapping relationship between the valid logical addresses and the valid data pages. The data storage method includes: allocating a first logical block and a second logical block, wherein the first logical block and the second logical block are mapped to the physical block, and the first logical block includes a plurality of consecutive first logical pages, which are used to store the logical addresses, and the second logical block includes a plurality of consecutive second logical pages; on executing garbage collection, sequentially and consecutively storing the valid logical addresses in the second logical pages in the order of the second logical pages according to the valid bits; and establishing a one-to-one second mapping relationship between the second logical pages and the valid data pages according to the first mapping relationship.

In summary, an embodiment of a data storage method and a system thereof according to the instant disclosure allocates two logical blocks, mapped to the same physical block, to store logical addresses, and on executing garbage collection, relocates the logical addresses stored in the first logical block to the second logical block to accomplish garbage collection without moving the written data in the physical block. Accordingly, the times of read-write to the physical pages are reduced and thereby the lifetime of the flash memory is increased.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
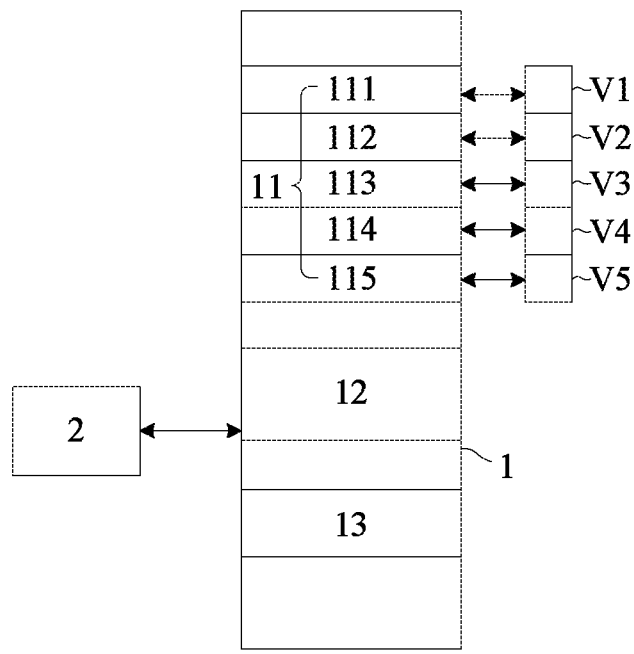
FIG. 1 is a functional block diagram of one embodiment of a data storage system according to the instant disclosure.

FIG. 1 is a functional block diagram of one embodiment of a data storage system according to the instant disclosure.

Figure 2:
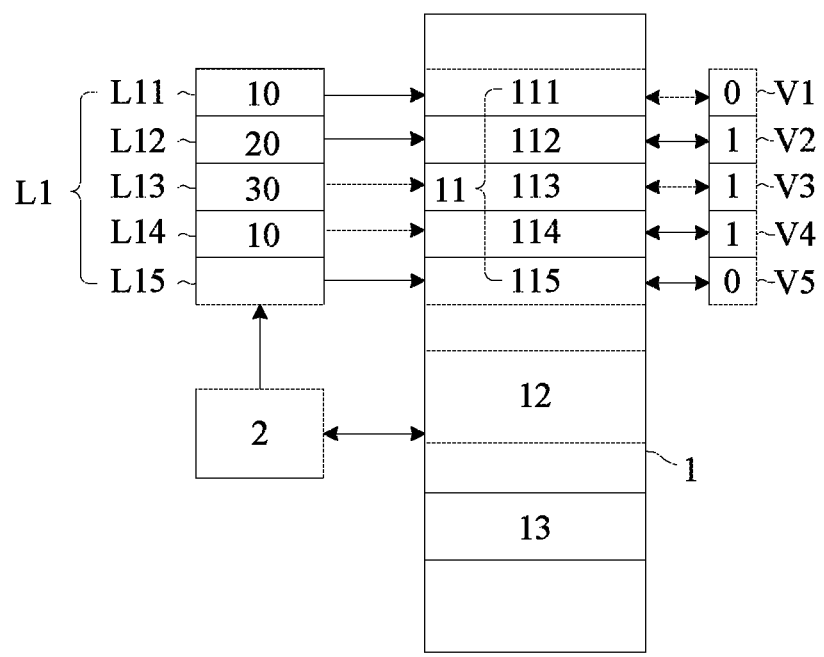
FIG. 2 is a functional block diagram of one embodiment of a first logical block, allocated by the processing unit in FIG. 1.
Figure 3:
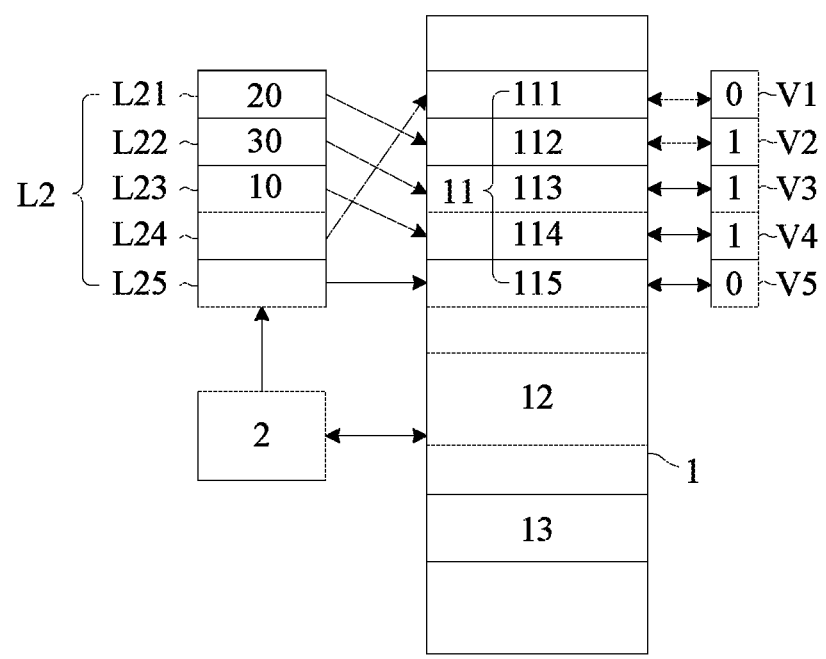
FIG. 3 is a functional block diagram of one embodiment of a second logical block, allocated by the processing unit in FIG. 1.

FIG. 2 is a functional block diagram of one embodiment of a first logical block L1, allocated by the processing unit 2 in FIG. 1. FIG. 3 is a functional block diagram of one embodiment of a second logical block L2, allocated by the processing unit 2 in FIG. 1.

With reference to FIG. 1 through FIG. 3, a data storage system includes a hard disk 1 and a processing unit 2. The processing unit 2 is electrically connected to the hard disk 1 to control the read/write operation of the hard disk 1. The hard disk 1 includes a plurality of physical blocks, and each physical block includes a plurality of physical pages. An example is illustrated in FIG. 1 through FIG. 3, where the physical blocks in the hard disk 1 includes physical blocks 11, 12, and 13, and the physical block 11 includes five physical pages 111~115. Herein, the processing unit 2 can store written data in the physical pages 111~115.

The physical pages 111~115 correspond to valid bits V1~V5, respectively, which indicate whether the written data stored in physical pages 111~115 are valid. If the written data stored in physical pages 111~115 are the old data, that is, no longer in use, then the written data are indicated invalid. Therein, the valid bit V1, corresponding to the physical page 111, indicates whether the written data stored in the physical page 111 are valid or invalid, and the valid bit V2, corresponding to the physical 112, indicates whether the written data stored in the physical page 112 are valid or invalid, and so on, which will not be described in details herein. Therefore, depending on whether the valid bits V1~V5 are a first value or a second value, the physical pages 111~115 can be classified as a valid data page and an invalid data page. For example, assuming the first value "1" and the second value "0", if the valid bit V1, corresponding to the physical page 111, is "0", the physical page 111 is indicated as an invalid data page; if the valid V4, corresponding to the physical page 114m is "1", the physical page 114 is indicated as a valid data page. In this way, the valid bits V1~V5 can be used to indicate whether the physical pages 111~115 include invalid data and further whether the space needs to be freed.

In this embodiment, each of the written data corresponds to a logical address, and each logical address is mapped to a corresponding page in the physical pages 111~115 so that the processing unit 2 can store the written data in the corresponding pages 111~115 according to the logical addresses. An example is illustrated in FIG. 2, where four logical addresses are "10", "20", "30", and "10", respectively, and the four logical addresses are mapped to the physical pages 111, 112, 113, and 114 respectively, so that the processing unit 2 can store the corresponding four written data in the physical pages 111~114 according to the four logical addresses. Therein, the physical pages 111 and 114 are mapped to the same logical address "10". Assuming the data are written in the physical page 114 later than into the physical page 111, the physical page 111 will be an invalid data page, while the other physical pages 112, 113 and 114 are still valid data pages. As such, logical addresses include valid logical addresses and invalid logical addresses, wherein the logical addresses mapped to valid data pages are valid logical addresses and the logical addresses mapped to invalid data pages are invalid logical addresses. Also, there is a one-to-one first mapping relationship between valid logical addresses and valid data pages. As illustrated in FIG. 2, "10" stored in a first logical page L11 is an invalid logical address, and "20", "30", and "40" stored in first logical pages L12~L14 are valid logical addresses. The logical address "20" of the valid logical addresses is one-to-one mapped to the physical page 112 of the valid data pages, the logical address "30" of the valid logical addresses is one-to-one mapped to the physical page 113 of the valid data pages, and the logical address "10" of the valid logical addresses is one-to-one mapped to the physical page 114 of the valid data pages. In practice, the logical addresses can be virtual addresses from I/O devices.

FIG. 3 is a functional block diagram of one embodiment of a second logical block L2, allocated by the processing unit 2 in FIG. 1. With reference to FIG. 2 and FIG. 3, the processing unit 2 is used to allocate a first logical block L1 and a second logical block L2, wherein the first logical block L1 includes a plurality of consecutive first logical pages, the second logical block L2 includes a plurality of consecutive second logical pages, and the first logical block L1 and the second logical block L2 are mapped to the same physical block in the hard disk 1. As illustrated in FIG. 2 and FIG. 3, the first logical block L1 and the second logical block L2 are both mapped to the physical block 11, wherein the first logical block L1 includes consecutive first logical pages L11~L15 and the second logical block L2 includes consecutive second logical pages L21~L25. In this embodiment, an example is illustrated in FIG. 2 and FIG. 3, where the processing unit 2 allocates two logical blocks L1 and L2 to be mapped to the physical block 11. However, the instant disclosure is limited thereto. The processing unit 2 can allocate a plurality of logical blocks to be mapped to a physical block in the hard disk 1, and the processing unit 2 can allocate a plurality of logical blocks to be mapped to each of the physical blocks in the hard disk 1. For example, the processing unit 2 can allocate four logical blocks to be mapped to the physical block 12 in the hard disk 1 and can allocate another three logical blocks to be mapped to the physical block 13 in the hard disk 1 so that a plurality of logical blocks are mapped to each of the physical blocks in the hard disk 1.

The first logical block L1 is used to store logical addresses, and on executing the write operation, the processing unit 2 sequentially stores the logical addresses, which correspond to the written data, respectively, in the first logical block L1. As illustrated in FIG. 2, the first logical pages L11~L14 include the first logical address "10", "20", "30" and "10" mentioned above, respectively, and the processing unit 2 write data in the corresponding physical pages 111~114 according to the logical addresses stored in the first logical pages L11~L14. After a plurality of written data are stored in the physical block 11 of the hard disk 1, once the available storage space is below a threshold value, the processing unit 2 will start to execute garbage collection to release the invalid data pages, which include the invalid data. First of all, the processing unit 2 sequentially and consecutively stores the valid logical addresses, according to the valid bits V1~V5, in the second logical pages L21~L24 in the order of the second logical pages L21~L24. In details, as illustrated in FIG. 2, the processing unit 2 decides whether the logical addresses of the first logical pages L12~L14 are valid logical addresses, depending on the values of the valid bits V1~V5; next, as illustrated in FIG. 3, the processing unit 2 stores the valid logical address "20", which is stored in the first logical page L12, in the second logical page L21 and the processing unit 2 stores the valid logical address "30", which is stored in the first logical page L13, in the second logical page L22, to which the second logical page L21 is consecutive to; last, the processing unit 2 stores the valid logical address "10", which is stored in the first logical page L14, in the second logical page L23, to which the second logical page L22 is consecutive, by which garbage collection is accomplished. Therefore, compared to the first logical block L1, the second logical block L2 does not include any logical address, which corresponds to an invalid data page, which makes the number of the blank pages in the logical block L2 (such as the second logical pages L24 and L25) to be greater than the number of the blank pages in the logical block L1 (such as the first logical page L15). Thus, compared to the prior art, the processing unit 2 does not need to move the written data in the physical block 11 to accomplish garbage collection. Accordingly, the times of read-write to the physical pages are reduced and thereby the lifetime of the flash memory is increased.

In this embodiment, after the processing unit 2 moves the valid logical addresses "20", "30" and "10" from the first logical block L1 to the second logical block L2, the processing unit 2 establishes a one-to-one second mapping relationship between the second logical pages L21~L23 and the valid data pages (i.e., the physical pages 112, 113, and 114), so that the second logical pages L21, L22 and L23 are respectively one-to-one mapped to the physical pages 112, 113 and 114 and further the valid logical addresses "20", "30", and "10" can be mapped to the physical pages 112, 113 and 114, where the corresponding written data are previously stored.

In practice, the processing unit 2 can be implemented with a micro-processor, a micro-controller, or a central processing unit, and can be controlled by software or firmware. The processing unit 2 can also be an application-specific IC (ASIC). The processing unit 2 can allocate a first logical block L1 and a second logical block L2 in a cache memory, or RAMs, to store logical addresses.

In an embodiment, the processing unit 2 sequentially stores the logical addresses in the consecutive pages in the first logical block L1 in the order of the first logical pages L11~L15. An example is illustrated in FIG. 2, where the processing unit 2 first stores the logical address "10" in the first logical page L11, then the processing unit 2 stores the logical address "20" in the first logical page L12, to which the first logical page L11 is consecutive, and then the processing unit 2 stores the logical address "30" in the first logical page L13, to which the first logical page L12 is consecutive, and last, the processing unit 2 stores the logical address "10" in the first logical page L14, to which the first logical page L13 is consecutive. Herein, after the four written data are stored in the physical block 11 in the hard disk 1, the first logical block L1 sequentially includes the four logical addresses in the order of the first logical pages L11~L14, wherein the four logical addresses are mapped to the valid data pages and the invalid data pages, respectively. Moreover, there is a one-to-one third mapping relationship between the first logical pages L11~L15 and the physical pages 111~115, so that the first mapping relationship is established between the valid logical addresses, which are stored in the first logical pages L11~L15, and the valid data pages according to the third mapping relationship. For example, as illustrated in FIG. 2, the first logical pages L11, L12, L13, L14, and L15 are mapped to the physical pages 111, 112, 113, 114, and 115, respectively. After the logical addresses "10", "20", "30" and "10" are stored in the logical pages L11, L12, L13, and L14, the valid logical addresses "20", "30", and "10" are one-to-one mapped to the valid data pages 112, 113, and 114 so that the first mapping relationship is established.

In an embodiment, after the processing unit 2 moves the logical addresses from the first logical block L1 to the second logical block L2, the processing unit 2 establishes a one-to-one fourth mapping relationship between the blank pages in the second logical block L2 and the invalid data pages in the physical page 111. An example is illustrated in FIG. 3, where the blank pages in the second logical block L2 are the second logical pages L24 and L25 and the processing unit 2 establishes the fourth mapping relationship that the second logical L24 and L25 are mapped to the physical pages 111 and 115, which are invalid data pages. Consequently, after garbage collection, the processing unit 2 can fill the logical addresses corresponding to another written data, such as the fifth and the sixth written data, into the second logical pages L24 and L25 so that the two written data can be stored in the corresponding physical pages 111 and 115 according to the fourth mapping relationship. Herein, whether the invalid data pages in the physical block 11 are consecutive or inconsecutive, the processing unit 2 can use them to store new written data by overwriting the original data after executing garbage collection.

In an embodiment, before the processing unit 2 executes any write operation, the third mapping relationship between the first logical block L1 and the physical block 11 can be pre-stored in the hard disk 1 or any other circuits with storage capability, so that the processing unit 2 can store, according to the pre-stored third mapping relationship, the written data in the corresponding physical pages 111~115 according to the page locations where the logical addresses are stored in the first logical block L1. After the processing unit 2 executes garbage collection for the first logical block L1, the processing unit 2 stores a fourth mapping relationship between the logical block L2 and the physical block 11 to overwrite the stored third mapping relationship so that the another written data as mentioned above, such as the fifth and the sixth written data, can be stored in the corresponding physical pages 111 and 115, according to the page locations where the corresponding logical addresses are stored in the second logical block L2. Herein, after executing garbage collection for the first logical block L1, the processing unit 2 will no longer use the first logical block L1 and will map the logical addresses to the physical block 11 via the second logical block L2.

According to the second mapping relationship, the third mapping relationship, and the fourth mapping relationship, it can be known that the first logical pages L11~L15 are one-to-one mapped to the physical pages 111~115, and the second logical pages L21~L25 are one-to-one mapped to the physical pages 111~115, that is, the number of the first logical pages L11~L15 is the same as the number of the physical pages 111~115, and the number of the second logical pages L21~L25 is the same as the number of the physical pages 111~115. Herein, when the processing unit 2 allocates logical blocks which one-to-one corresponds to each physical block of the hard disk 1, since the number of the logical pages of each logical block is the same as the number of the physical pages of each physical block, the processing unit 2 can use the number of the blank pages in the first logical block L1 to determine whether the available storage space in the hard disk 1 has reached the threshold value, and to decide whether to execute garbage collection for the first logical block L1. In the same way, the processing unit 2 can use the number of the blank pages in the second logical block L2 to determine whether the available storage space in the hard disk 1 has reached the threshold value, and to decide whether to execute garbage collection for the second logical block L1.

In an embodiment, to prevent the logical addresses from not being mapped to the physical block 11 due to power outage of an electronic device with a data storage system, before the processing unit 2 executes garbage collection, the processing unit 2 can store the first mapping relationship and the third mapping relationship in the hard disk 1. In this way, the electronic device can access the first mapping relationship and the third mapping relationship from the hard disk 1 after the power is back on and the processing unit 2 can store the written data in the hard disk 1 according to the first mapping relationship and the third mapping relationship. Moreover, after executing garbage collection, the processing unit 2 can store the second mapping relationship and the fourth mapping relationship in the hard disk 1, to prevent the logical addresses from not being mapped to the physical block 11 due to the power outage of the electronic device.

Figure 4:
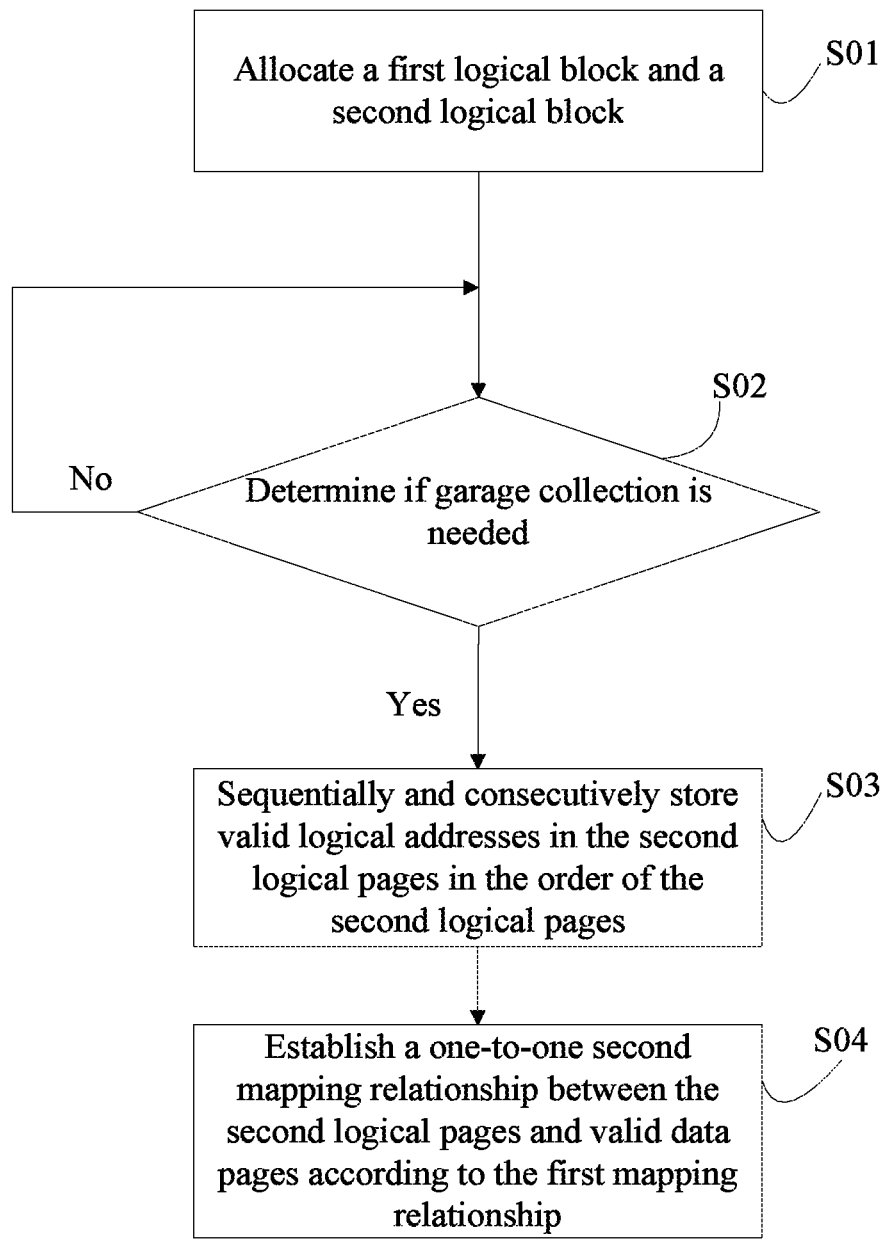
FIG. 4 is a flow chart of one embodiment of a data storage method according to the instant disclosure.

FIG. 4 is a flow chart of one embodiment of a data storage method according to the instant disclosure. With reference to FIG. 1 through FIG. 4, the processing unit 2 allocates a first logical block L1 and a second logical block L2 (Step S01). An example is illustrated in FIG. 2 and FIG. 3, where the first logical block L1 includes first logical pages L11~L15, the second logical block L2 includes second logical pages L21~L25, and the first logical pages L11~L15 and the second logical pages L21~L25 are used to store the logical addresses corresponding to written data. Next, the processing unit 2 determines if garbage collection is needed for the hard disk 1 (Step S02). When the available storage space of the hard disk 1 is smaller than or equal to a threshold value so that garbage collection is needed, the processing unit 2 sequentially and consecutively stores the valid logical addresses in the second logical pages L21~L25 in the order of the second logical pages L21~L25 according to the valid bits V1~V5 (Step S03) to accomplish garbage collection. At last, the processing unit 2, according to the first mapping relationship between the valid logical addresses and the valid data pages, establishes a one-to-one second mapping relationship between the logical pages, including the logical addresses, in the second logical pages L21~L25 and the valid data pages (Step S04).

In an embodiment, before the processing unit executes any write operation, a data storage method further includes establishing a one-to-one third mapping relationship between the first logical pages L11~L15 and the physical pages 111~115; next, when the processing unit 2 executes write operation, the processing unit 2 sequentially and consecutively stores the logical addresses in the first logical pages L11~L15 in the order of the first logical pages L1~L15 so that the first mapping relationship is established between the valid logical address (i.e., the logical addresses stored in the first logical pages L12~L14) and the valid data pages (i.e. the physical pages 112~114 mentioned above) according to the third mapping relationship.

In an embodiment, after executing Step S04, the processing unit 2 establishes a one-to-one fourth mapping relationship between the blank pages in the second logical pages L21~L25 (i.e. the second logical pages L24 and L25) and the invalid data pages (the physical pages 111 and 115) so that the fifth written data and the sixth written data can be stored in the physical pages 111 and 115 according to the logical addresses in the second logical pages L24 and L25.

In an embodiment, before executing Step S03, the processing unit 2 stores the first mapping relationship and the third mapping relationship in the hard disk 1 to prevent the logical addresses from not being mapped to the physical pages 111~115 due to the power outage of the data storage system. Similarly, after executing Step S03, the processing unit 2 stores the second mapping relationship and the fourth mapping relationship in the hard disk 1 to prevent the logical addresses from not being mapped to the physical pages 111~115 due to the power outage of the data storage system.

In summary, an embodiment of a data storage method and a system thereof according to the instant disclosure stores logical addresses by allocating two logical blocks, mapped to the same physical block; and upon executing garbage collection, moves the logical addresses stored in the first logical block to the second logical blocks to accomplish garbage collection, without moving the written data in the physical blocks. Accordingly, the times of read-write to the physical pages are reduced and thereby the lifetime of the flash memory is increased.

While the instant disclosure has been described by the aforementioned embodiments, it is to be understood that the invention needs not be limited to the disclosed embodiments. For anyone skilled in the art, various modifications and variations within the spirit of the instant disclosure are covered under the scope of the instant disclosure. The covered scope of the instant disclosure is based on the appended claims.

What is claimed is:

1. A data storage system, comprising:
a solid-state disk, including a physical block, which includes a plurality of physical pages, which store a plurality of written data corresponding to a plurality of logical addresses, wherein each of the physical pages corresponds to a valid bit, and each of the physical pages with the valid bit corresponding to a first value is classified as a valid data page or each of the physical pages with the valid bit corresponding to a second value is classified as an invalid data page; and
a processing unit, allocating a first logical block and a second logical block in a volatile memory, wherein the first logical block and the second logical block are mapped to the physical block simultaneously, and the first logical block includes a plurality of consecutive first logical pages and the second logical block includes a plurality of consecutive second logical pages, wherein the first logical pages are used to store the logical addresses, which include a plurality of valid logical addresses, which are mapped to the valid data pages, and there is a one-to-one first mapping relationship between the valid logical addresses and the valid data pages, and the second logical pages are blank; and the processing unit determines whether an available storage space for storing the written valid data in the solid-state disk is below a threshold value according to a corresponding number of the blank pages in the first logical block, and the processing unit executes garbage collection when the available storage space in the first logical block is below the threshold value, wherein the threshold value denotes a number of available pages in the first logical block: on executing garbage collection, the processing unit sequentially and consecutively stores the valid logical addresses in the second logical pages in the order of the second logical pages according to the valid bits rather than moving the written data between the physical pages, and the processing unit establishes a one-to-one second mapping relationship between the second logical pages and the valid data pages according to the first mapping relationship;
wherein after having executed garbage collection, the processing unit further establishes a one-to-one third mapping relationship between the blank pages in the second logical blocks and the invalid data pages.

2. The data storage system according to claim 1, wherein there is a one-to-one fourth mapping relationship between the first logical pages and the physical pages, the processing unit sequentially and consecutively stores the logical addresses in the first logical pages in the order of the first logical pages so that there is the first mapping relationship between the valid logical addresses and the valid data pages according to the fourth mapping relationship.

3. The data storage system according to claim 2, wherein the invalid data pages are not consecutive to one another.

4. The data storage system according to claim 1, wherein before the logical addresses are stored in the first logical pages, the processing unit stores the fourth mapping relationship so that after the logical addresses are stored in the first logical pages, the processing unit establishes the first mapping relationship between the valid logical addresses and the valid data pages and after executing garbage collection, the processing unit stores the third mapping relationship to overwrite the fourth mapping relationship.

5. The data storage system according to claim 4, wherein the invalid data pages are not consecutive to one another.

6. The data storage system according to claim 1, wherein before executing garbage collection, the processing unit stores the first mapping relationship and the fourth mapping relationship in the solid-state disk and after executing garbage collection the processing unit stores the second mapping relationship and the third mapping relationship in the solid-state disk.

7. A data storage method of storing a plurality of written data in a plurality of physical pages in a physical block in a solid-state disk according to a plurality of logical addresses, wherein each of the physical pages corresponds to a valid bit, and each of the physical pages with the valid bit corresponding to a first value is classified as a valid data page or each of the physical pages with the valid bit corresponding to a second value is classified as an invalid data page, wherein the logical addresses include a plurality of valid logical addresses, which are mapped to the valid data pages, and there is a one-to-one first mapping relationship between the valid logical addresses and the valid data pages, and the second logical pages are blank; the data storage method including:
    allocating a first logical block and a second logical block, wherein the first logical block and the second logical block in a volatile memory are mapped to the physical block simultaneously, and the first logical block includes a plurality of consecutive first logical pages, which are used to store the logical addresses, and the second logical block includes a plurality of consecutive second logical pages;
    determining whether an available storage space for storing the written valid data in the solid-state disk is below a threshold value according to a corresponding number of the blank pages in the first logical block, and executing garbage collection when the available storage space in the first logical block is below the threshold value, wherein the threshold value denotes a number of available pages in the first logical block;
    sequentially and consecutively storing the valid logical addresses in the second logical pages in the order of the second logical pages according to the valid bits rather than moving the written data between the physical pages on executing garbage collection;
    and establishing a one-to-one second mapping relationship between the second logical pages and the valid data pages according to the first mapping relationship;
    wherein after having executed the garbage collection, the processing unit further establishes a one-to-one third mapping relationship between the remaining blank pages in the second logical blocks and the invalid data pages.

8. The data storage method according to claim 7, further including establishing a one-to-one fourth mapping relationship between the first logical pages and the physical pages; sequentially and consecutively storing the logical addresses in the first logical pages in the order of the first logical pages so that the first mapping relationship is established between the valid logical addresses and the valid data pages according to the fourth mapping relationship.

9. The data storage method according to claim 7, before executing the procedure of sequentially and consecutively storing the logical addresses in the first logical pages in the order of the first logical pages, further including storing the fourth mapping relationship so to, after the logical addresses being stored in the first logical pages, establish the first mapping relationship between the valid logical addresses and the valid data pages;
    after executing the procedure of garbage collection, further including storing the third mapping relationship to overwrite the fourth mapping relationship.

10. The data storage method according to claim 7, wherein the blank pages are not consecutive.

11. The data storage method according to claim 7, wherein before executing the procedure of garbage collection, further including: storing the first mapping relationship and the fourth mapping relationship in the solid-state disk; after executing the procedure of garbage collection, storing the second mapping relationship and the third mapping relationship in the solid-state disk.

12. The data storage method according to claim 9, wherein before executing the procedure of garbage collection, further including: storing the first mapping relationship and the third mapping relationship in the solid-state disk; after executing the procedure of garbage collection, storing the second mapping relationship and the third mapping relationship in the solid-state disk.

* * * * *